United States Patent
Kuhmann et al.

(10) Patent No.: US 12,516,178 B2
(45) Date of Patent: Jan. 6, 2026

(54) THERMOPLASTIC COMPOSITIONS OF POLYETHERETHERKETONES HAVING IMPROVED TRIBOLOGICAL MATERIAL PROPERTIES AND USE THEREOF

(71) Applicant: Evonik Operations GmbH, Essen (DE)

(72) Inventors: Karl Kuhmann, Duelmen (DE); Reinhard Linemann, Saarbruecken (DE); Joscha Sandhusen, Gelsenkirchen (DE); Frank Lorenz, Olfen (DE); Vera Schiemann, Marl (DE); Alois K. Schlarb, Trippstadt (DE); Lena Josch, Neustadt an der Weinstrasse (DE); Michael Busse, Heusweiler (DE); Leyu Lin, Kaiserslautern (DE)

(73) Assignee: Evonik Operations GmbH, Essen (DE)

( * ) Notice: Subject to any disclaimer, the term of this patent is extended or adjusted under 35 U.S.C. 154(b) by 334 days.

(21) Appl. No.: 18/006,595

(22) PCT Filed: Jul. 9, 2021

(86) PCT No.: PCT/EP2021/069173
§ 371 (c)(1),
(2) Date: Jan. 24, 2023

(87) PCT Pub. No.: WO2022/022988
PCT Pub. Date: Feb. 3, 2022

(65) Prior Publication Data
US 2023/0272190 A1    Aug. 31, 2023

(30) Foreign Application Priority Data

Jul. 28, 2020 (EP) .................................. 20188129

(51) Int. Cl.
*C08K 9/06* (2006.01)
*C08K 3/04* (2006.01)
(Continued)

(52) U.S. Cl.
CPC .................. *C08K 9/06* (2013.01); *C08K 3/04* (2013.01); *C08K 3/22* (2013.01); *C08K 3/36* (2013.01);
(Continued)

(58) Field of Classification Search
CPC ... C08K 9/06; C08K 3/04; C08K 3/22; C08K 3/36; C08K 7/06; C08K 2003/2241;
(Continued)

(56) References Cited

U.S. PATENT DOCUMENTS

| | | |
|---|---|---|
| 2005/0181194 A1 | 8/2005 | Haupert et al. |
| 2005/0208313 A1 | 9/2005 | Bickle et al. |

(Continued)

FOREIGN PATENT DOCUMENTS

| | | |
|---|---|---|
| CA | 2721225 A1 * | 5/2012 |
| DE | 102 25 783 A1 | 12/2003 |

(Continued)

OTHER PUBLICATIONS

International Search Report and Written Opinion issued on Aug. 20, 2021 in PCT/EP2021/069173, filed on Jul. 9, 2021, 13 pages (with English Translation of Category of Cited Documents).

*Primary Examiner* — Mark Eashoo
*Assistant Examiner* — Zhen Liu
(74) *Attorney, Agent, or Firm* — Oblon, McClelland, Maier & Neustadt, L.L.P.

(57) ABSTRACT

A thermoplastic component may include a matrix component (A) and a filler component (B). The matrix component (A) may include a polyetheretherketone and the filler component (B) may include inorganic particles and carbon- (Continued)

Rising load test: Sliding speed increased stepwise beginning at 0.5 m/s (10 h), 1 m/s (7.5 h), 2 m/s (5 h), 3 m/s (5) to 4 m/s (2.5 h).

containing particles. The overall composition may include equal or different portions, as filler component (B), of hydrophobic silicon dioxide, carbon fibres, titanium dioxide particles, graphite particles, and a particulate lubricant selected from divalent metallic sulfides and alkaline earth metal sulfates.

15 Claims, 1 Drawing Sheet

(51) Int. Cl.
*C08K 3/22* (2006.01)
*C08K 3/30* (2006.01)
*C08K 3/36* (2006.01)
*C08K 7/06* (2006.01)

(52) U.S. Cl.
CPC ........ *C08K 7/06* (2013.01); *C08K 2003/2241* (2013.01); *C08K 2003/3009* (2013.01); *C08K 2003/3018* (2013.01); *C08K 2003/3045* (2013.01); *C08K 2201/004* (2013.01); *C08K 2201/005* (2013.01)

(58) Field of Classification Search
CPC .... C08K 2003/3009; C08K 2003/3018; C08K 2003/3045; C08K 2201/004; C08K 2201/005; C08K 3/30; C08K 2201/003; B29B 7/20; B29B 7/484; C08J 3/226; C08L 71/10
See application file for complete search history.

(56) References Cited

U.S. PATENT DOCUMENTS

| | | | |
|---|---|---|---|
| 2015/0126663 A1* | 5/2015 | Burkhart | |
| 2015/0203712 A1* | 7/2015 | Gopalakrishnan | ...... B29C 43/00 524/508 |
| 2018/0273707 A1* | 9/2018 | Price | .................... B29C 43/003 |

FOREIGN PATENT DOCUMENTS

| | | |
|---|---|---|
| EP | 1 511 624 B1 | 12/2005 |
| EP | 1 511 625 B1 | 12/2005 |
| EP | 0 526 296 B1 | 3/2009 |
| WO | WO 03/103954 A1 | 12/2003 |

* cited by examiner

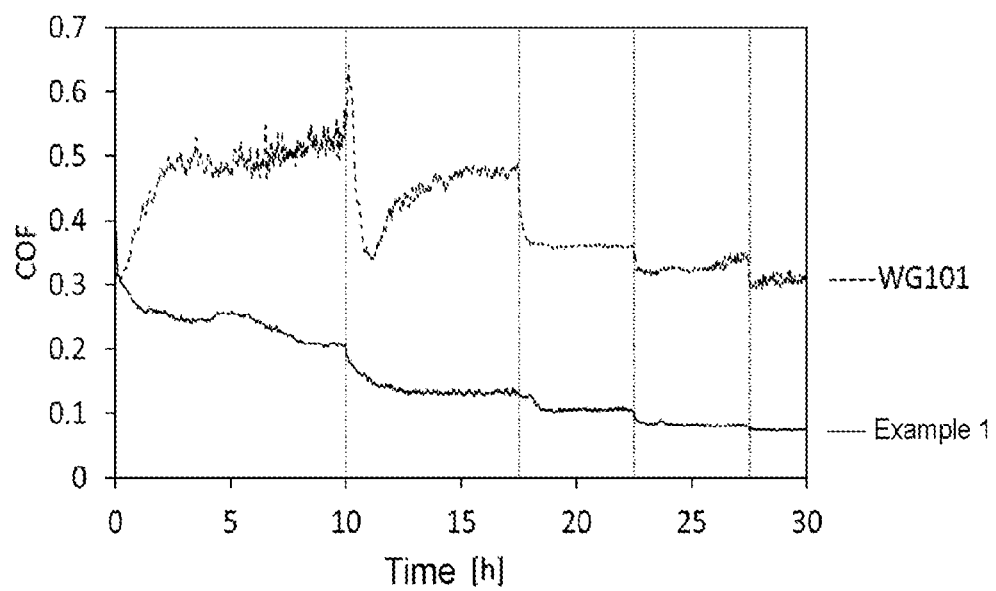
Rising load test: Sliding speed increased stepwise beginning at 0.5 m/s (10 h), 1 m/s (7.5 h), 2 m/s (5 h), 3 m/s (5) to 4 m/s (2.5 h).

THERMOPLASTIC COMPOSITIONS OF POLYETHERETHERKETONES HAVING IMPROVED TRIBOLOGICAL MATERIAL PROPERTIES AND USE THEREOF

CROSS-REFERENCE TO RELATED APPLICATIONS

The present application is the national stage of international application PCT/EP2021/069173, filed on Jul. 9, 2021, and claims the benefit of the filing date of European Appl. No. 20188129.9, filed on Jul. 28, 2020.

The invention relates to a thermoplastic composition comprising a matrix component A) and a filler component B), wherein the matrix component A) comprises a polyetheretherketone and the filler component B) including inorganic particles and carbon-containing particles, and the overall composition includes equal or different portions of hydrophobic silicon dioxide, carbon fibres, titanium dioxide particles, graphite particles and a particulate lubricant selected from divalent metallic sulfides and alkaline earth metal sulfates.

EP1511624B1, EP1511625B1 and EP1526296B1 disclose preparation of polyetheretherketones for the production of slide bearing composite materials having a metallic protective layer, wherein the slide bearing composite material includes a sliding layer material based on PEEK with zinc sulfide and/or barium sulfate, carbon fibres, graphite particles and titanium dioxide for altering the material properties of the polymeric matrix.

For saving of carbon dioxide and for minimization of energy demand, there is an increased demand for lightweight high-performance materials, the properties of which correspond to those of metallic materials in toolmaking, the automotive sector and aircraft construction, in order to replace them.

Moreover, certain selected fillers and the anisotropic alignment thereof can have quite a considerable influence on macroscopic material properties. Furthermore, particular fillers, on account of elevated temperature or under the action of electromagnetic radiation, can contribute to accelerated breakdown of the polymeric matrix as catalytically active sites. This may be of particular relevance in the case of polymeric matrices with heteroatoms.

The problem addressed is therefore that of providing a composition based on polyetheretherketones having improved tribological and ductile properties, and especially improved rates of wear under elevated pressure and/or at elevated temperature.

It has now been found that, surprisingly, hydrophobic silicon dioxide, especially hydrophobic fumed silicon dioxide, in combination with carbon fibres improves the rate of wear of polyetheretherketones under tribological stress at elevated temperature without any adverse effect on ductility.

The invention provides a thermoplastic composition
A) having a matrix component comprising polyetheretherketones and
B) having a filler component,
characterized in that
30% to 95% by weight of polyetheretherketones is present as matrix component A) relative to the overall composition of the thermoplastic composition, comprising the polyetheretherketone structural element of the formula I

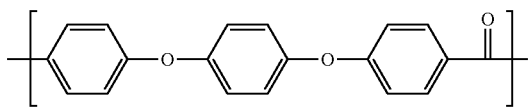

with MVR of 10 to 90 cm$^3$/10 min determined at 400° C., load 2.16 kg, capillary (length 8 mm*diameter of 2.095 mm) and 5% to 70% by weight of inorganic and carbon-containing particles is present as filler component B) in the overall composition of the thermoplastic composition, comprising, relative to the overall composition, 1% to 20% by weight of hydrophobic silicon dioxide,
1% to 20% by weight of carbon fibres,
1% to 20% by weight of titanium dioxide particles,
1% to 20% by weight of graphite particles and
1% to 20% by weight of a particulate lubricant selected from divalent metallic sulfides and alkaline earth metal sulfates,
where the overall composition is 100% by weight,
for use as component in lubricant-free tribological applications.

The present invention further provides a process for producing the compositions according to the invention, wherein the process according to the invention is executed by compounding in an extruder, by feeding at least one masterbatch containing hydrophobic silicon dioxide into a base feed and feeding in carbon fibres downstream.

The invention further provides for the use of the compositions according to the invention for production of shaped articles and components produced therefrom in lubricant-free tribological applications.

The compositions according to the invention, the process according to the invention and the use according to the invention are described by way of example hereinafter, without any intention that the invention be restricted to these illustrative embodiments. Where ranges, general formulae, or classes of compound are stated below, these are intended to encompass not only the corresponding ranges or groups of compounds mentioned explicitly, but also all subranges and subgroups of compounds that can be obtained by extracting individual values (ranges) or compounds. Where documents are cited in the context of the present description, the entire content thereof is intended to be part of the disclosure content of the present invention. Where percentage data are provided hereinafter, these are data in % by weight unless otherwise stated. In the case of compositions, % values are based on the total composition unless otherwise stated. Where average values are provided hereinafter, these are averages by mass (averages by weight) unless otherwise stated. Where measured values are given hereinafter, these measured values were determined at a pressure of 101 325 Pa and at a temperature of 25° C. unless otherwise stated.

The scope of protection includes finished and packaged forms that are conventionally used in commerce for the products of the invention, not only per se but also in possible comminuted forms to the extent that these are not defined in the claims.

One advantage of the compositions according to the invention and of the components produced therefrom is that tribological properties are improved over the prior art. In particular, friction is reduced and wear is lowered. This shows the particularly advantageous use of SiO$_2$ particles in the compositions according to the invention.

A further advantage of the compositions according to the invention is reduced friction, especially in systems in which one component consists of metal and the other of the compositions according to the invention. It is further advantageous that coefficients of friction are low even at elevated temperature. Moreover, there is an improvement in properties with respect to occurrence of friction.

One advantage of the specially adjusted process settings is firstly the production of a homogeneous composition, and secondly that, in relation to the carbon fibres used, the carbon fibres are shortened in a defined manner.

It is particularly advantageously possible to achieve tribological applications at elevated temperature with the aid of the compositions according to the invention.

In addition, it has been found that a specific fibre length of the carbon fibres in combination with hydrophobic silicon dioxide particles exerts an additional positive effect on the tribological properties of the polyetheretherketones. Use of hydrophobized silicon dioxide, especially hydrophobized fumed silicon dioxide, distinctly reduced the adverse effect exerted by customary silicon particles on melt viscosity in the production of the thermoplastic composition.

In order to further improve the processability of the thermoplastic composition at the high processing temperatures necessary for the compositions according to the invention, the melt viscosity was adjusted specifically to the filler component via a selection of the molecular weight of the polyetheretherketones. The compositions according to the invention comprise, as matrix component, polyetheretherketones having an MVR of 10 to 90 cm$^3$/10 min, preferably 15 to 80 cm$^3$/10 min, more preferably 20 to 75 cm$^3$/10 min, especially preferably 30 to 60 cm$^3$/10 min, determined at 400° C., a load of 2.16 kg, with the aid of a capillary of length 8 mm and diameter 2.095 mm.

The matrix component preferably consists of polyetheretherketone.

The carbon fibres used, prior to processing, preferably have a fibre length of 4 to 8 mm, more preferably of 5 to 7 mm, and a diameter of preferably 5 to 10 micrometres (μm) and more preferably 6 to 8 μm.

The compositions according to the invention are found to be advantageous in that the process settings enable firstly the production of a homogeneous composition and, secondly, in relation to the carbon fibres used, the carbon fibres used are shortened. It is particularly advantageous here that the shortened carbon fibres have a characteristic distribution as a result of the process regime.

The compositions according to the invention preferably comprise carbon fibres having a fibre length of 15 to 555 μm; preferably at least 95% (based on the number of fibres) of the carbon fibres have a fibre length of 15 to 350 micrometres, more preferably at least 90% of the carbon fibres have a fibre length of 20 to 300 μm, particularly preferably at least 75% of the carbon fibres have a fibre length of 25 to 180 μm, and especially preferably at least 50% of the carbon fibres have a fibre length of 30 to 110 μm.

Hydrophobic silicon dioxide used in the compositions according to the invention is preferably fumed hydrophobic silicon dioxide.

The person skilled in the art knows how fumed silicon dioxide particles are produced; these are preferably obtained by oxidative flame processes by decomposition of halosilanes.

Prior to processing, the hydrophobic fumed silicon dioxide has a particle size distribution $D_{50}$ of 2 to 5 μm, preferably 2.5 to 4 μm, and a $D_{100}$ of less than 150 μm, preferably a $D_{100}$ of less than 100 μm, the particle size distribution having been determined to ISO 13320 with dry-dispersed particles.

According to ISO 13320, particle sizes are preferably determined with a Malvern Mastersizer 3000 in a dry air stream.

The hydrophobic fumed silicon dioxide has a carbon content of 1% to 2% by weight to ISO 3262-20, based on the silicon dioxide.

The hydrophobic fumed silicon dioxide preferably has primary particles having a primary particle size of 10 to 30 nanometres.

The hydrophobic fumed silicon dioxide preferably has modification with methyl groups.

Further preferably, the hydrophobic fumed silicon dioxide comprises agglomerates of silicon dioxide agglomerates having particle sizes of the agglomerates of 400 nm to 100 micrometres. It is further preferable here when agglomerates of aggregate particles of silicon dioxide having particle sizes of $D_{50}$ of 2 to 20 micrometres, and especially with $D_{90}$ of not more than 50 micrometres, are used, preference being given to agglomerates with $D_{50}$ of 2 to 5 micrometres and preferably with $D_{90}$ of not more than 20 micrometres. It has been found to particularly advantageous when the agglomerates, on account of the processing conditions, have at least partly aggregated to form the aggregate particles. Thus, the composition preferably comprises hydrophobic fumed silicon dioxide comprising agglomerates of aggregate particles of silicon dioxide, where the silicon dioxide has surface methyl groups.

Particular preference is given to hydrophobic fumed silicon dioxide comprising primary particles of 10 nanometres to 100 nanometres, preferably of 10 to 30 nanometres, where the silicon dioxide has especially been surface modified with organofunctional silanes, the silicon dioxide preferably having been modified with alkyl-functional silanes, and the silicon dioxide more preferably having surface methyl groups.

The graphite particles of the compositions according to the invention preferably have particle size distributions with $D_{100}$ of less than 70 μm, more preferably less than 60 μm, particularly preferably less than 50 μm and especially preferably less than 40 μm.

The graphite particles preferably have a particle size distribution with $D_{50}$ of 5 to 15 μm, preferably 8 to 12 μm, and a $D_{100}$ of less than 50 μm, preferably less than 40 μm.

Further preferably, the mode diameter ($D_{mode}$), i.e. the maximum of the distribution, varies by not more than 30%, preferably 25%, of the measurement from $D_{50}$. More preferably, $D_{50}$ is less than 30%, preferably 25%, smaller than $D_{mode}$.

Further preferably, the graphite particles have a particle size distribution with $D_{50}$ of 5 to 15 μm, with a $D_{100}$ of less than 50 μm, and with the $D_{50}$ less than 25% smaller than the mode diameter.

The carbon content of the graphite particles is preferably not less than 99% by weight, especially not less than 99.5% by weight, preferably greater than 99.7% to 99.99% by weight, relative to the overall composition of the graphite particles of 100% by weight.

The measurement of the particle size distribution is conducted to ISO 13320 with dry-dispersed particles.

According to ISO 13320, particle sizes are preferably determined with a Malvern Mastersizer 3000 in a dry air stream.

Preferred titanium dioxide particles of the compositions according to the invention have an outer shell comprising metal oxides containing silicon, aluminium and/or zirconium, or mixed oxides comprising these, where the titanium dioxide particles are at least partly to completely encased with the aforementioned shell. The titanium dioxide particles are preferably fully encased with a shell of mixed oxides containing silicon, aluminium and zirconium. The titanium dioxide particles with a preferably complete outer shell comprising metal oxides containing silicon, aluminium and/or zirconium, or mixed oxides comprising these, are preferably in core-shell form and have preferably been produced by a plasma method or thermal method. The titanium dioxide particles used in accordance with the invention are thus preferably titanium dioxide core-shell particles, the core of which comprises titanium dioxide and the shell of which consists of a metal oxide having no catalytic properties, especially no photocatalytic properties. More particularly, the titanium dioxide particles have a completely closed shell. These titanium dioxide particles may thus also be referred to as core-shell particles with a core comprising titanium dioxide and a shell comprising mixed oxides containing silicon, aluminium and zirconium. This prevents formation of catalytically active sites by titanium dioxide at elevated temperature and/or under elevated tribological influence, which contribute to accelerated breakdown of the polymeric matrix. It has been found that it is a drawback of titanium dioxide particles having no outer inert shell that these titanium dioxide particles can act as catalytically active sites under the influence of electromagnetic radiation, tribological stress and/or elevated temperature. But in order to be able to utilize the mechanical properties of the titanium dioxide and simultaneously to avoid the adverse effects of the titanium dioxide particles, preference is given to using these specific titanium dioxide particles provided with a protective outer shell. Therefore, particular preference is given to using titanium dioxide particles having a shell comprising silicon compounds, aluminium compounds and/or zirconium compounds, especially oxides thereof, in thermoplastic compositions. The oxides of the aforementioned compounds may be present in the shell as $SiO_2$, zirconium dioxide, $Al_2O_3$ or mixed oxides and the silicatic compounds, i.e. crystalline compounds, of the aforementioned compounds. These particles are inactivated with regard to their ability to function as catalytic sites in a polymeric matrix.

The titanium dioxide particles preferably have a bimodal particle distribution.

Preferred titanium dioxide particles have a particle size of 100 nanometres (nm) to 10 micrometres, especially preferably with $D_{50}$ of 150 to 600 nm, more preferably with $D_{50}$ of 250 to 500 nm.

The particle size distribution further preferably has a maximum ($D_{mode}$) of 280 to 350 nm, preferably of 295 to 330 nm.

Further preferably, the titanium dioxide particles preferably have a bimodal particle size distribution, where the second maximum is in the range from 2.5 to 6 µm, preferably in the range from 3 to 5 µm.

Further preferably, the particle sizes of the titanium dioxide particles in the bimodal distribution have a weight ratio of the two ranges (range 1 contains $D_{mode}$, range two contains the second maximum) of 7:1 to 9.5:1, preferably of 8:1 to 9.3:1 and more preferably of 9:1 (preferably assuming a measurement accuracy of the area ratios of 3%).

The measurement of the particle size distribution is conducted to ISO 13320 with dry-dispersed particles.

According to ISO 13320, particle sizes are preferably determined with a Malvern Mastersizer 3000 in a dry air stream.

The titanium dioxide particles have preferably been surface-modified with Si, Zr and Al.

Further preferably, the titanium dioxide particles preferably have a bimodal particle size distribution and have been surface-modified.

Further preferably, the titanium dioxide particles preferably have a bimodal particle size distribution with a maximum ($D_{mode}$) of 280 to 350 nm (range 1) and a second maximum in range 2 of 2.5 to 6 µm, and have been surface-modified with Si, Zr and Al.

The particulate lubricants of the composition according to the invention are selected from divalent metallic sulfides and alkaline earth metal sulfates, preferably ZnS and/or $BaSO_4$, the particulate lubricant is especially ZnS. The particulate lubricants preferably have a particle size distribution $D_{90}$ of less than 20 µm, preferably of not more than 15 µm, more preferably 10 µm and especially preferably of not more than 5 µm.

In addition, the particulate lubricants preferably have a $D_{50}$ of 500 to 1000 nm, more preferably of 600 to 950 nm, particularly preferably of 700 to 900 nm and especially preferably of 750 to 850 nm.

Further preferably, the particulate ZnS lubricant has a $D_{50}$ of 500 to 1000 nm and a $D_{90}$ of less than 20 µm, especially a $D_{50}$ of 700 to 900 nm and a $D_{90}$ of not more than 5 µm.

The measurement of the particle size distribution is conducted to ISO 13320 with wet-dispersed (water-dispersed) particles.

According to ISO 13320, particle sizes are preferably determined with a Malvern Mastersizer 3000.

Extensive material tests were conducted with a thermoplastic composition comprising 60% by weight of polyetheretherketones as matrix component A) and 40% by weight of filler component B) comprising 10% by weight of hydrophobized $SiO_2$, 10% by weight of graphite particles, 10% by weight of carbon fibres, 5% by weight of ZnS and 5% by weight of $TiO_2$, contents each relative to the total composition of the thermoplastic composition of 100% by weight. For this composition, it has been found that, surprisingly, excellent tribological characteristics are obtained with relatively high MVR of the polyetheretherketones.

Preference is given to a thermoplastic composition comprising 30% to 95% by weight of polyetheretherketones as matrix component A) comprising the polyetheretherketone structural element of the formula I

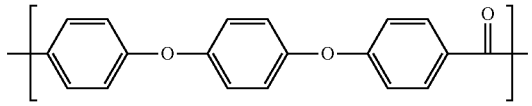

with MVR of 10 to 90 $cm^3/10$ min, preferably 15 to 80 $cm^3/10$ min, more preferably 20 to 75 $cm^3/10$ min, especially preferably 30 to 60 $cm^3/10$ min, determined at 400° C., load 2.16 kg, capillary having a length of 8 mm and a diameter of 2.095 mm, inlet angle 180°, and filler component B) comprising 2% to 20% by weight of hydrophobic fumed silicon dioxide, 2% to 20% by weight of carbon fibres, 1% to 15% by weight of a particulate lubricant selected from divalent metallic sulfides and alkaline earth metal sulfates, 2% to 20% by weight of graphite particles and 1% to 15% by weight of titanium dioxide particles having a bimodal particle size distribution, based on the overall composition.

Particular preference is given to a thermoplastic composition comprising 30% to 90% by weight of polyetheretherketones having structural elements of the formula I as matrix component A) having MVR of 10 to 90 cm³/10 min, especially preferably 15 to 80 cm³/10 min, more preferably 20 to 75 cm³/10 min, especially preferably 30 to 60 cm³/10 min, determined at 400° C., load 2.16 kg, capillary having a length of 8 mm and a diameter of 2.095 mm, inlet angle 180°, and comprising 5% to 15% by weight of hydrophobic fumed silicon dioxide having a particle size distribution having a $D_{50}$ of 2 to 5 µm, preferably 2.5 to 4 µm, and a $D_{100}$ of less than 150 µm, preferably a $D_{100}$ of less than 100 µm, 2% to 8% by weight of ZnS as particulate lubricant having a particle size $D_{50}$ of 500 to 1000 nm, preferably of 600 to 950 nm, more preferably of 700 to 900 nm and especially preferably of 750 to 850 nm, 5% to 15% by weight of graphite particles, 2% to 8% by weight of titanium dioxide particles having a bimodal particle size distribution and having been surface-modified with Si, Zr and Al, and 5% to 15% by weight of carbon fibres, based on the overall composition of the thermoplastic composition with 100% by weight.

A particularly preferred thermoplastic composition consists to an extent of 30% to 81% by weight of the polyetheretherketones with MVR of 10 to 90 cm³/10 min, especially preferably 15 to 80 cm³/10 min, more preferably 20 to 75 cm³/10 min, especially preferably 30 to 60 cm³/10 min, 2% to 8% by weight of ZnS as particulate lubricant having a particle size distribution with $D_{50}$ of 500 to 1000 nm and a $D_{90}$ of less than 20 µm, especially a $D_{50}$ of 700 to 900 nm and a $D_{90}$ of not more than 5 µm, 5% to 15% by weight of graphite having a particle size of 0.5 to 30 µm, preferably of 5 to 20 µm, more preferably of 5 to 15 µm, especially preferably 8 to 12 µm, 2% to 8% by weight of titanium dioxide particles having a bimodal particle size distribution with a maximum ($D_{mode}$) of 280 to 350 nm (range 1) and a second maximum in range 2 of 2.5 to 6 µm, and additionally having been surface-modified with Si, Zr and Al, 5% to 15% by weight of hydrophobic fumed silicon dioxide having a particle size distribution having a $D_{50}$ of 2 to 5 µm, preferably 2.5 to 4 µm, and a $D_{100}$ of less than 150 µm, preferably a $D_{100}$ of less than 100 µm, and 5% to 15% by weight of chopped carbon fibres having a diameter of 5 to 10 µm, preferably 6 to 8 µm, and fibre lengths of 15 to 555 µm, based on the overall composition of the thermoplastic composition with 100% by weight.

An especially preferred thermoplastic composition consists of 30% to 73.5% by weight of the polyetheretherketones with MVR of 10 to 90 cm³/10 min, especially preferably 15 to 80 cm³/10 min, more preferably 20 to 75 cm³/10 min, especially preferably 30 to 60 cm³/10 min, 7.5% to 12.5% by weight of hydrophobic fumed silicon dioxide having a carbon content of 1% to 2% by weight to ISO 3262-20, based on the silicon dioxide, having a particle size distribution having a $D_{50}$ of 2.5 to 4 µm, and a $D_{100}$ of less than 100 µm, 2% to 8% by weight of ZnS as particulate lubricant having a particle size distribution with $D_{50}$ of 700 to 900 nm and a $D_{90}$ of not more than 5 µm, 7.5% to 12.5% by weight of graphite particles having a particle size distribution with $D_{50}$ of 5 to 15 µm, preferably 8 to 12 µm, and a $D_{100}$ of less than 50 µm, preferably less than 40 µm, 2% to 8% by weight of titanium dioxide particles having a bimodal particle size distribution with a maximum ($D_{mode}$) of 280 to 350 nm (range 1) and a second maximum in range 2 of 2.5 to 6 µm, where the weight ratio of the two ranges is from 7:1 to 9.5:1, preferably from 8:1 to 9.3:1 and more preferably 9:1, and the particles have additionally been surface-modified with Si, Zr and Al, and 7.5 to 12.5% by weight of carbon fibres having a diameter of 6 to 8 µm, where at least 90% of the carbon fibres have a fibre length of 20 to 300 µm, more preferably at least 75% of the carbon fibres have a fibre length of 25 to 180 µm, and especially preferably at least 50% of the carbon fibres have a fibre length of 30 to 110 µm, based on the overall composition of the thermoplastic composition with 100% by weight.

The present invention further provides a process for producing a thermoplastic composition and a composition obtainable by the process, wherein the process comprises at least a step i) wherein i) a first masterbatch is produced by mixing, in an extruder, preferably in a twin-screw extruder, more preferably a co-rotating twin-screw extruder with dispersing and mixing zones, of 40% to 95% by weight, preferably 60% to 90% by weight, of polyetheretherketone comprising structural elements of the formula I with an MVR of 10 to 90 cm³/10 min, especially preferably 15 to 80 cm³/10 min, more preferably 20 to 75 cm³/10 min, especially preferably 30 to 60 cm³/10 min, determined at 400° C., load 2.16 kg, capillary having a length of 8 mm and a diameter of 2.095 mm, inlet angle 180°, with 5% to 60% by weight, preferably 10% to 40% by weight, of hydrophobic silicon dioxide, especially hydrophobic fumed silicon dioxide, at elevated temperature, preferably close to the melting point of the polyetheretherketone or higher, preferably at 350 to 500° C., a first masterbatch is obtained, and wherein the first masterbatch is produced at a vacuum pressure of 1000 to 5 mbar, preferably of 800 to 10 mbar, more preferably of 500 to 50 mbar and especially preferably of 300 to 100 mbar, each as absolute pressure, wherein this first masterbatch is fed into a base feed and carbon fibres are fed in downstream and the thermoplastic composition is obtained.

A preferred process according to the invention, as well as the aforementioned process step i), has a further process step ii) wherein ii) a second masterbatch is produced by mixing, in an extruder, preferably in a twin-screw extruder, more preferably in a co-rotating twin-screw extruder with dispersing and mixing zones, of 30% to 90% by weight, preferably 50% to 80% by weight, of polyetheretherketone comprising structural elements of the formula I with an MVR of 10 to 90 cm³/10 min, determined at 400° C., load 2.16 kg, capillary having a length of 8 mm and a diameter of 2.095 mm, inlet angle 180°, with 5% to 40% by weight, preferably 10% to 30% by weight, of titanium dioxide particles and 5% to 40% by weight, preferably 10% to 30% by weight, of a particulate lubricant selected from divalent metallic sulfides and alkaline earth metal sulfates, at elevated temperature, preferably close to the melting point of the polyetheretherketone or higher, preferably at 350 to 500° C., a second masterbatch is obtained, wherein the first and second masterbatches are fed into a base feed and carbon fibres are fed in downstream and the thermoplastic composition is obtained.

A particularly preferred process according to the invention, as as well as the aforementioned process steps i) and ii), has a further process step iii) wherein iii) the composition is produced by producing a mixture comprising 0% to 70% by weight, preferably 1% of 50% by weight, more preferably 2% to 20% by weight, especially preferably 3% to 10% by weight, of polyetheretherketone having structural elements of the formula I, having an MVR of 10 to 90 cm$^3$/10 min, determined at 400° C., load 2.16 kg, capillary having a length of 8 mm and a diameter of 2.095 mm, inlet angle 180°, the first masterbatch and the second masterbatch at elevated temperature by mixing in an extruder, preferably in a twin-screw extruder, more preferably in a co-rotating twin-screw extruder with dispersing and mixing zones, preferably close to the melting point of the polyetheretherketone or higher, preferably at 350 to 550° C., wherein graphite particles and carbon fibres are successively added to and mixed with this mixture downstream, preferably at 350 to 550° C., and the thermoplastic composition is obtained.

The fillers in the compositions according to the invention that are not listed in the process steps may already be present in the base feed or may be added later, preference is given to adding no fillers after addition of the carbon fibres.

The aforementioned FIGURES in the respective process step in % by weight are based on the overall composition of 100% by weight of the first masterbatch in step i), the overall composition of 100% by weight of the second masterbatch in step ii), and the overall composition of 100% by weight of the composition in step iii).

The weight ratio, preferably in process step iii), of first masterbatch to second masterbatch is preferably set at a ratio of 0.1 (1:10) to 10 (10:1), preferably of 0.5 to 5, more preferably of 1 to 3.

The first and second masterbatches are preferably produced at 380 to 450° C. in an extruder. The thermoplastic composition is preferably also produced at 380 to 450° C. in an extruder.

Preference is given to using carbon fibres having a fibre length of 4 to 8 mm, more preferably of 5 to 7 mm, and a diameter of preferably 5 to 10 micrometres (μm) and more preferably 6 to 8 μm.

After step iii), in the process according to the invention, the thermoplastic composition can be cooled down and processed, preferably pelletized, or shaped articles produced directly and then cooled.

The abovementioned preferences for the filler components are also correspondingly applicable to the process according to the invention.

The thermoplastic compositions according to the invention and the thermoplastic compositions obtainable by the process according to the invention are used for production of three-dimensional shaped articles.

The present invention further provides components, such as preferably semifinished products, profiles, filaments and films, comprising the thermoplastic composition, wherein the production of the shaped articles is familiar to the person skilled in the art. These are obtainable in an a) injection moulding process comprising one- to multi-component injection moulding processes, b) fused deposition modelling (FDM) or fused filament fabrication (FFF), c) pressing methods, d) extrusion method including co-extrusion methods, optionally with calendering or, for example, film blowing, and/or e) in a material-removing process.

Resultant shaped articles, semifinished products and profiles may be processed further and bonded by customary joining methods for thermoplastics, for example radiative, vibration, heating-element or ultrasound welding or bonding. The present invention thus also provides components, especially integral components made from the thermoplastic composition. Pelletized materials are especially understood to mean pelletized materials that are usable in injection moulding, extrusion or pressing methods and/or in small particle sizes (powder) for powder-based methods such as the laser sintering method. It is also possible, for example, to coat metallic components with the thermoplastic composition.

The pelletized materials preferably have a particle size in the range from 0.5 to 10 mm and have round, oval or angular cross sections. Preference is given to near-cylindrical shapes.

The shaped articles according to the invention are used for production of components in tribological applications, preferably as machine elements such as bearings or gears, and parts thereof.

The thermoplastic compositions are preferably used as what are called tribological compounds since they show particular suitability for parts, components and machine elements that are under high tribological stress, for example radial or axial bearings (slide bearings) having a layer of the thermoplastic composition at least in the friction surface.

Bearings or other shaped articles according to the invention may, for example, be equipped with a thermoplastic composition only very thinly in the friction area. For example, thin friction layers of the thermoplastic composition may be applied to steel sleeve/steel strip (for example as a foil) or else other friction layers. In addition, the parts or components having the friction layer may consist of the thermoplastic composition as an integral part. In addition, it is possible to produce hybrid constructions (multicomponent parts or composite parts) from different plastics as well: for example tribological compound plus support layer of alternative plastic and/or further regions of other materials. In addition, hybrid components or hybrid constructions (multicomponent parts), in addition to the inventive thermoplastic composition, may include further, different polymeric components and/or metal-based materials. In addition, it is possible to use hybrid slide bearings with metal support areas and thinner areas of the thermoplastic compositions.

Also likewise easily possible is a combination with foamed plastic areas in lightweight construction and in applications with reduced moving masses. Additionally possible are combinations with polymer-based fibre-reinforced composites (e.g. tapes or organosheets).

Overall, it is possible to achieve composite parts comprising or consisting of the thermoplastic compositions according to the invention and tribologically non-optimized polymer compositions and/or further materials.

The thermoplastic compositions according to the invention are suitable in principle for production or as a part-component for all tribologically stressed components such as bearings, rails, roll elements, optionally gears, etc. The components may be produced either wholly or only partly (in the glide region) from the thermoplastic composition. It is additionally possible to use the thermoplastic compositions in applications in which the components are subject to dry friction, for example plastic-on-plastic or plastic-on-metal, as in the case of a steel shaft.

In the field of equivalence of the invention are applications of equivalent compositions and the shaped articles and components thereof in operation with a lubricant, such as oil, grease, etc.

One advantage of the use according to the invention is manifested in wear against metal surfaces. For instance, depending on the test conditions chosen, such as the alloy chosen, surface roughness of the metal friction partner, load conditions resulting inter alia from relative speed, pressure and temperature in the section area, for instance in a block-on-ring test, the wear rates for components consisting of the thermoplastic compositions can be distinctly reduced, and very low coefficients of friction are found.

FIG. 1 shows, in a rising load test at a pressure of 4 MPa with speed increasing stepwise, the coefficients of friction of inventive example 1 and of a commercial material, WG 101 from Victrex (CompEx 2). The details of the rise are given in the descriptive text for Table 2. The lower coefficients of friction of the shaped article according to the invention are clearly apparent.

It is particularly advantageous that components made of the compositions according to the invention do not cause any adaptation problems at all after a change in speed. Friction very rapidly settles at a new constant value, it being essential that the fiction does not fluctuate, i.e. does not show transient behaviour. This is particularly advantageous since changes in running speed, for example in a concentric runner bearing, i.e. the speed of rotation, does not result in any additional stresses in other components, i.e., for example, large jumps in torque that affect the axis of a concentric bearing.

Materials:

PEEK: polyetheretherketone from Evonik with different MVR $SiO_2$: fumed silica, hydrophobized, carbon content 1.2% by weight (ISO 3262-20); particle diameter (dry-dispersed) $D_{50}$ 3.13 μm, $D_{100}$<80 μm ZnS: particle size (wet-dispersed) $D_{50}$ 0.80 μm, $D_{90}$<5 μm Carbon fibres: Sigrafil C C6-4.0/240-T190

Graphite particles: particle size (dry-dispersed) D50 9.3 μm, D100<35 μm $TiO_2$: particle diameter (dry-dispersed) D (mode, max) 350 nm, D (bimod, max) 3.5 μm; surface-modified with Si, Zr and Al EXAMPLE 1: Composition Based on PEEK with MVR 34 cm³/10 min (test weight 2.16 kg/400° C.)

EXAMPLE 2: Composition Based on PEEK with MVR 72 cm³/10 MIN (Test Weight 2.16 kg/400° C.)

Production of the Thermoplastic Composition in a Twin-Screw Extruder

Masterbatch 1: 80% by weight of PEEK and 20% by weight of $SiO_2$, extruded (melt temperature 439° C., housing temperature 390° C.), with employment of a vacuum pressure for devolatilization of about 300 to 100 mbar absolute (at the position of addition of silica).

Masterbatch 2: 60% by weight of PEEK, 20% by weight of $TiO_2$ and 20% by weight of zinc sulfide (melt temperature 428° C., housing temperature 390° C.).

50% by weight of masterbatch 1 and 25% by weight of masterbatch 2 were fed together into the base feed of the extruder (5% by weight of the respective PEEK); 10% by weight of graphite and 10% by weight of carbon fibres were successively fed in downstream. The melt temperature was 439° C. and the housing temperature 390° C. The product is pelletized at the end of the extrusion.

Thus, the compositions according to the invention from the examples comprise 60% by weight of PEEK, 10% by weight of $SiO_2$ particles, 5% by weight of ZnS particles, 10% by weight of graphite particles, 5% by weight of $TiO_2$ particles and 10% by weight of carbon fibres.

A comparative example (CompEx 1) comprises 60% by weight of PEEK (VESTAKEEP 2000, product from Evonik), 10% by weight of ZnS particles, 10% by weight of graphite particles, 10% by weight of $TiO_2$ particles and 10% by weight of carbon fibres.

A further comparative example (CompEx 2) is WG101, a commercial product from Victrex.

Test specimens: The pellets were injection-moulded into plaques; the dimensions of the plaques were a thickness of 4 mm and an area of 50 mm*50 mm.

The test specimens were machined as cubic blocks. They have a test area of 4×4 mm² with a length of 10 mm. The fibres were aligned essentially in the test plane; the vectors of frictional force and the vector of fibre alignment were orthogonal to one another.

For determination of the tribological properties, block-on-ring and pin-on-disc tests were conducted; test specimens had identical dimensions:

Measurement was effected at different speeds (v=0.5, 1, 2, 3 and 4 m/s) and with different contact pressures (pressure loads) (p=1, 2, 4, 8 and 10 MPa). After a running-in phase, the testing phase commenced. The block was formed from the test material; the ring and disc are made of steel (100Cr6H). The wear rate was measured by determining the loss of mass. The measurements were conducted at different temperatures without use of lubricants.

Coefficients of friction (COF, friction value) and wear rate $W_s$ [$10^{-6}$ mm³/Nm] were determined. The calculation of the wear rate is based on the loss of mass of the test specimen according to the formula: $W_s=(\Delta m)/\rho v t F_n$, where $\Delta m$ is the loss of mass, p the density of the test material, v the sliding speed and t the test duration. $F_n$ is the contact force of the test specimen.

The values in Tables 1a to 1d were found at 23° C. on the block-on-ring test bench. The run-in phase was 2 h, the testing phase 20 h. The steel ring had a roughness depth (Rz) of 2 μm and an arithmetic average roughness (roughness, Ra) of 0.2 μm.

TABLE 1a

Coefficients of friction with a contact pressure of 1 MPa as a function of sliding speed, 23° C.

| | Coefficient of friction; 1 MPa | | | | |
| --- | --- | --- | --- | --- | --- |
| | 0.5 m/s | 1 m/s | 2 m/s | 3 m/s | 4 m/s |
| Example 1 | 0.24-0.26 | 0.2-0.21 | 0.16-0.17 | 0.12-0.14 | 0.07-0.08 |
| Example 2 | 0.26-0.28 | 0.25-0.26 | 0.17-0.18 | 0.13-0.14 | 0.11-0.12 |
| CompEx 2 | 0.31-0.32 | 0.32-0.34 | 0.38-0.39 | 0.31-0.32 | 0.24-0.25 |

The coefficients of friction of Inventive Examples 1 and 2 are lower than those of the commercial Victrex WG101 product. Moreover, there was a distinct decrease in the coefficients of friction of Inventive Examples 1 and 2 with increasing sliding speed, whereas the coefficients of friction of CompEx 2 actually increase starting from a speed of 0.5 m/s up to a speed of 2 m/s.

TABLE 1b

Coefficients of friction with a contact pressure of 2 MPa as a function of sliding speed, 23° C.

| | Coefficient of friction; 2 MPa | | | | |
|---|---|---|---|---|---|
| | 0.5 m/s | 1 m/s | 2 m/s | 3 m/s | 4 m/s |
| Example 1 | 0.18-0.19 | 0.14-0.15 | 0.13-0.14 | 0.08-0.09 | 0.06-0.07 |
| Example 2 | 0.26-0.27 | 0.18-0.19 | 0.1-0.11 | 0.07-0.08 | 0.03-0.04 |
| CompEx 2 | 0.48-0.49 | 0.46-0.47 | 0.35-0.36 | 0.27-0.28 | 0.27-0.28 |

There is a further decrease in the low coefficients of friction of Inventive Examples 1 and 2 with increasing speed and increased contact pressure of 2 MPa.

TABLE 1c

Coefficients of friction at a contact pressure of 4 MPa as a function of sliding speed

| | Coefficient of friction; 4 MPa | | | | |
|---|---|---|---|---|---|
| | 0.5 m/s | 1 m/s | 2 m/s | 3 m/s | 4 m/s |
| Example 1 | 0.22-0.23 | 0.14-0.15 | 0.11-0.12 | 0.17-0.18 | 0.16-0.17 |
| Example 2 | 0.17-0.18 | 0.12-0.14 | 0.08-0.09 | 0.1-0.11 | 0.04-0.05 |
| CompEx 2 | 0.47-0.49 | 0.35-0.37 | 0.27-0.28 | 0.23-0.24 | 0.21-0.22 |

There is a continuous further decrease in the coefficient of friction of Inventive Example 2 with increasing speed even at a further-increased contact pressure of 4 MPa. For the composition of Example 1, a minimum in the coefficient of friction is found at a speed of 2 m/s.

TABLE 1d

Coefficients of friction at a contact pressure of 8 MPa as a function of sliding speed

| | Coefficient of friction; 8 MPa | | | | |
|---|---|---|---|---|---|
| | 0.5 m/s | 1 m/s | 2 m/s | 3 m/s | 4 m/s |
| Example 1 | 0.17-0.19 | 0.16-0.17 | 0.12-0.14 | 0.08-0.09 | 0.07-0.08 |
| Example 2 | 0.22-0.23 | 0.18-0.19 | 0.15-0.16 | 0.1-0.11 | 0.08-0.09 |
| CompEx 2 | 0.43-0.44 | 0.33-0.35 | 0.24-0.26 | 0.17-0.18 | 0.16-0.17 |

The coefficients of friction of Inventive Example 1 are lower than those of Example 2. There is a continuous further decrease in both coefficients of friction with increasing speed at a further-increased contact pressure of 8 MPa. Example 1 has similarly good coefficients of friction at 8 MPa as at 2 MPa.

The values in Table 2 are rising load tests; they were found at 23° C. on the block-on-ring test bench. Without a running-in phase, sliding speed increased stepwise beginning at 0.5 m/s (10 h), 1 m/s (7.5 h), 2 m/s (5 h), 3 m/s (5) to 4 m/s (2.5 h). The steel ring had a roughness depth (Rz) of 2 μm and an arithmetic average roughness (roughness, Ra) of 0.2 μm.

TABLE 2

Wear rates as a function of contact pressure with an increase in speed from 0.5 m/s to 4 m/s

| | Wear rate [$10^{-6}$ mm$^3$/Nm] | | | |
|---|---|---|---|---|
| | 1 MPa | 2 MPa | 4 MPa | 8 MPa |
| Example 1 | 0.51-0.53 | 0.45-0.47 | 0.32-0.34 | 0.28-0.29 |
| Example 2 | 0.23-0.25 | 0.25-0.26 | 0.35-0.37 | 0.26-0.27 |
| CompEx 2 | 0.73-0.75 | 0.72-0.73 | 0.65-0.66 | 0.32-0.34 |

The wear rates of Inventive Examples 1 and 2 are lower than those of Victrex WG101. In addition, there is a distinct and continuous decrease in the wear rates of Inventive Example 1 with increasing contact pressure.

FIG. 1 shows the rising load experiments for test specimens from Example 1 and CompEx 2 at a contact pressure of 4 MPa; the measurements of the coefficient of friction were found at 20° C.

The values in Tables 3a and 3b were found at 23° C. and 100° C. on the pin-on-disc test bench. The test phase was 5000 m. The steel ring had a roughness depth (Rz) of 5 μm and an arithmetic average roughness (roughness, Ra) of 0.4 μm.

TABLE 3a

Pin-on-disc, wear rate at 1 m/s

| | | Wear rate [$10^{-6}$ mm$^3$/Nm] | |
|---|---|---|---|
| | | 4 MPa | 10 MPa |
| Example 1 | 25° C. | 4.91 | 1.5 |
| Example 2 | 25° C. | 2.5 | 1.08 |
| Example 1 | 100° C. | 2.77 | 1.03 |
| Example 2 | 100° C. | 2.43 | 1.07 |

TABLE 3b

Pin-on-disc, coefficient of sliding friction at 1 m/s

| | | Coefficient of friction | |
|---|---|---|---|
| | | 4 MPa | 10 MPa |
| Example 1c | 25° C. | 0.23 | 0.07 |
| Example 2b | 25° C. | 0.12 | 0.09 |
| Example 1c | 100° C. | 0.05 | 0.05 |
| Example 2b | 100° C. | 0.08 | 0.03 |

There is a distinct decrease in the wear rate and coefficients of friction of the inventive examples under elevated contact pressure and even with increasing temperature.

The values in Tables 4a, 4b, 5a and 5b were found at 25° C. on the block-on-ring test bench. The steel ring had an arithmetic average roughness (roughness, Ra) of 0.1 μm-0.2 μm.

TABLE 4a

Wear rates compared to the material of the KS slide bearing (EP 1511625 B2, sample PEEK 6)

| | Wear rate [$10^{-6}$ mm$^3$/Nm][1] | | | |
|---|---|---|---|---|
| Conditions | 1 MPa; 3 m/s | 1 MPa; 4 m/s | 3 MPa; 1 m/s | 5 MPa; 1 m/s |
| Example 1 | 0.59 | 0.87 | 0.32 | 0.84 |
| CompEx 1 | 0.91 | 1.62 | 0.33 | 1.98 |

It is apparent from these tests too that the components made from the compositions according to the invention are advantageous over the prior art. More particularly, these tests show the advantageous use of $SiO_2$ particles in tribological applications. In these tests, this is manifested particularly at high load pressure or high speed.

TABLE 5a

Wear rates, block-on-ring, as a function of the quotient of pressure load and speed (p/v [MPa * s/m])

| | Wear rate [$10^{-6}$ mm$^3$/Nm]$^1$ | | | |
|---|---|---|---|---|
| Ratio | 1 MPa: 2 m/s | 1 MPa: 4 m/s | 3 MPa: 2 m/s | 4 MPa: 2 m/s |
| Example 1 | 0.9 | 0.6 | 0.3 | 0.3 |
| CompEx 1 | 1.5 | 3.1 | 2.8 | 2.2 |

TABLE 5b

Coefficients of friction, block-on-ring, as a function of the quotient of pressure load and speed (p/v [MPa * s/m])

| | Coefficient of friction | | | |
|---|---|---|---|---|
| Ratio | 1 MPa: 2 m/s | 1 MPa: 4 m/s | 3 MPa: 2 m/s | 4 MPa: 2 m/s |
| Example 1 | 0.27 | 0.18 | 0.12 | 0.09 |
| CompEx 1 | 0.28 | 0.25 | 0.31 | 0.17 |

The wear rates and coefficients of friction are lower across the board than those of the prior art. This likewise clearly shows the advantageous effect of the addition of $SiO_2$ particles in the polymer component of a tribological system.

The invention claimed is:

1. A thermoplastic composition, comprising:
(A) a matrix component comprising polyetheretherketones; and
(B) a filler component,
wherein a content of the polyetheretherketones is from 30 to 95 wt. % based on a total weight of the thermoplastic composition, and wherein the polyetheretherketone comprises a structural element of the following formula (I):

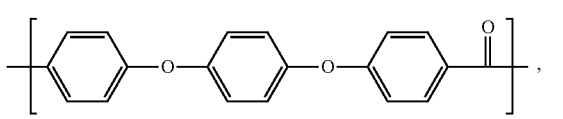

(I)

having Melt Volume-flow Rate (MVR) of from 10 to 90 cm$^3$/10 min determined at 400° C., load 2.16 kg, in a capillary having a length of 8 mm and a diameter of 2.095 mm, inlet angle 180°, and
wherein the filler component (B) comprises from 5 to 70 wt. % of inorganic and carbon-containing particles based on a total weight of the thermoplastic composition, and comprises, based on a total weight of the thermoplastic composition,
from 1 to 20 wt. % of hydrophobic silicon dioxide,
from 1 to 20 wt. % of carbon fibers,
from 1 to 20 wt. % of titanium dioxide particles,
from 1 to 20 wt. % of graphite particles, and
from 1 to 20 wt. % of a particulate lubricant comprising a divalent metallic sulfide and/or alkaline earth metal sulfate,
wherein the total weight of the thermoplastic composition is 100 wt. %,
wherein the thermoplastic composition is suitable for at least one lubricant-free tribological application, and
wherein the hydrophobic silicon dioxide has a particle size distribution D50 of from 2 to 5 m, and a D100 of less than 150 μm, the particle size distribution having been determined according to ISO 13320 with dry-dispersed particles.

2. The composition of claim 1, comprising, as the filler component (B),
from 2 to 20 wt. % of the hydrophobic silicon dioxide,
from 2 to 20 wt. % of the carbon fibers,
from 1 to 15 wt. % of the particulate lubricant,
from 2 to 20 wt. % of the graphite particles, and
from 1 to 15 wt. % of the titanium dioxide particles, and
wherein the total weight of the thermoplastic composition is 100 wt. %.

3. The composition of claim 1, comprising
from 30 to 81 wt. % of the polyetheretherketones comprising the polyetheretherketone structural element of the formula (I),
from 5 to 15 wt. % of the hydrophobic silicon dioxide,
from 2 to 8 wt. % of the particulate lubricant,
from 5 to 15 wt. % of the graphite particles,
from 2 to 8 wt. % of the titanium dioxide particles, and
from 5 to 15 wt. % of the carbon fibers,
wherein the total weight of the thermoplastic composition is 100 wt. %.

4. The composition of claim 1, comprising
from 30 to 73.5 wt. % of polyetheretherketones comprising the polyetheretherketone structural element of the formula (I),
from 7.5 to 12.5 wt. % of the hydrophobic silicon dioxide,
from 2 to 8 wt. % of the particulate lubricant,
from 7.5 to 12.5 wt. % of the graphite particles,
from 2 to 8 wt. % of the titanium dioxide particles, and
from 7.5 to 12.3 wt. % of the carbon fibers,
wherein the total weight of the thermoplastic composition is 100 wt. %.

5. The composition of claim 1, wherein the carbon fibers have a fiber length of from 15 to 555 μm.

6. The composition of claim 1, wherein the hydrophobic silicon dioxide has a carbon content of from 1 to 2 wt. % determined according to ISO 3262-20, based on the silicon dioxide.

7. The composition of claim 1, wherein the titanium dioxide particles have a bimodal particle size distribution.

8. The composition of claim 1, wherein the graphite particles have a particle size distribution D50 of from 5 to 15 μm, and a D100 of less than 50 μm, the particle size distribution having been determined according to ISO 13320 with dry-dispersed particles.

9. The composition of claim 1, wherein the particulate lubricant is ZnS and has a particle size distribution having a $D_{50}$ of from 500 to 1000 nm and a $D_{90}$ of less than 20 μm.

10. A process for producing the thermoplastic composition of claim 1, the process comprising:
(i) producing a first masterbatch by mixing, in an extruder, of polyetheretherketone containing structural elements of the formula (I):

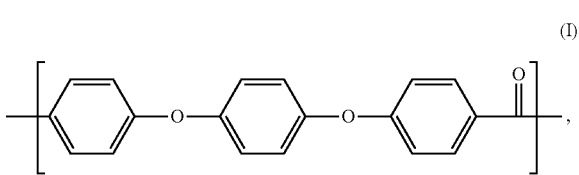

(I)

with hydrophobic silicon dioxide at an elevated temperature, and at a vacuum pressure of from 1000 to 5 mbar absolute, to obtain the first masterbatch;

feeding the first masterbatch into a base feed, and feeding carbon fibers in downstream to obtain the thermoplastic composition.

11. The process of claim 10, wherein the first masterbatch is produced at a vacuum pressure of from 300 to 100 mbar absolute.

12. The process of claim 10, wherein
(i) the elevated temperature is from 380 to 450° C., and/or
(ii) a second masterbatch is produced at a temperature of from 380 to 450° C., in an extruder, and/or
(iii) the thermoplastic composition is produced at a temperature of from 380 to 450° C.

13. A process for producing a shaped article, the process comprising:
(a) injection molding comprising one- to multi-component injection molding,
(b) fused deposition modelling or fused filament fabrication,
(c) pressing,
(d) extruding and/or co-extruding, optionally with calendering or film blowing, and/or
(e) material-removing,
the thermoplastic material of claim 1.

14. A process for influencing tribology, the process comprising:
contacting with a machine element the thermoplastic material of claim 1 as component in at least one lubricant-free tribological application.

15. The process of claim 10, wherein the hydrophobic silicon dioxide comprises hydrophobic fumed silicon dioxide.

* * * * *